United States Patent
Cumming et al.

(10) Patent No.: US 6,283,079 B1
(45) Date of Patent: Sep. 4, 2001

(54) SYSTEM FOR PREVENTING VIBRATIONS IN A DIESEL ENGINE

(75) Inventors: Brian Stanley Cumming, Maldon; Roy William Horrock, Brentwood, both of (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/645,901

(22) Filed: Aug. 25, 2000

(51) Int. Cl.$^7$ ................................................ F02B 75/06
(52) U.S. Cl. ................................................ 123/192.1
(58) Field of Search ................................ 123/192.2, 192.1

(56) References Cited

U.S. PATENT DOCUMENTS

| | | |
|---|---|---|
| 4,982,707 | 1/1991 | Maeda et al. |
| 5,033,425 | 7/1991 | Kadomukai et al. |
| 5,186,136 | 2/1993 | Kadomukai et al. |
| 5,722,359 | 3/1998 | Chubachi et al. |
| 5,730,094 | 3/1998 | Morris. |

*Primary Examiner*—Noah P. Kamen
(74) *Attorney, Agent, or Firm*—Carlos Hanze

(57) ABSTRACT

A system for preventing vibrations occurring in a diesel engine during shut down. The system employs a combined starter/alternator apparatus to apply a positive and/or negative torque to an engine to effect a smooth deceleration of the rotating parts of the engine. A system control function is provided wherein the engine speed from a vehicle engine speed sensor and the vehicle ignition key off signal are introduced to a control means to determine if the rate of engine speed deceleration is above or below a selected threshold level. If the rate of deceleration is above the selected threshold level, a command is generated by the control means to cause power to be absorbed from a rotating part of the engine to slow the engine. If the rate of engine deceleration is below the selected threshold level, a command is generated to add torque to the engine rotating part to prevent rapid deceleration.

10 Claims, 1 Drawing Sheet

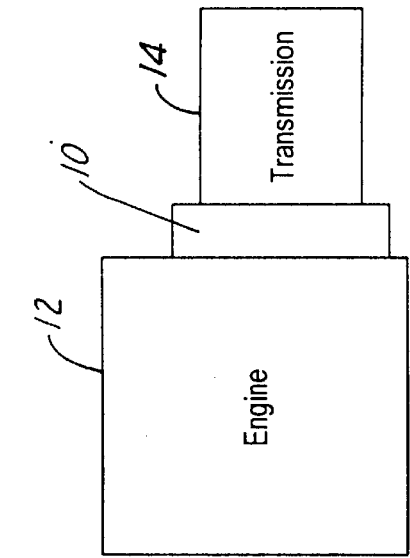
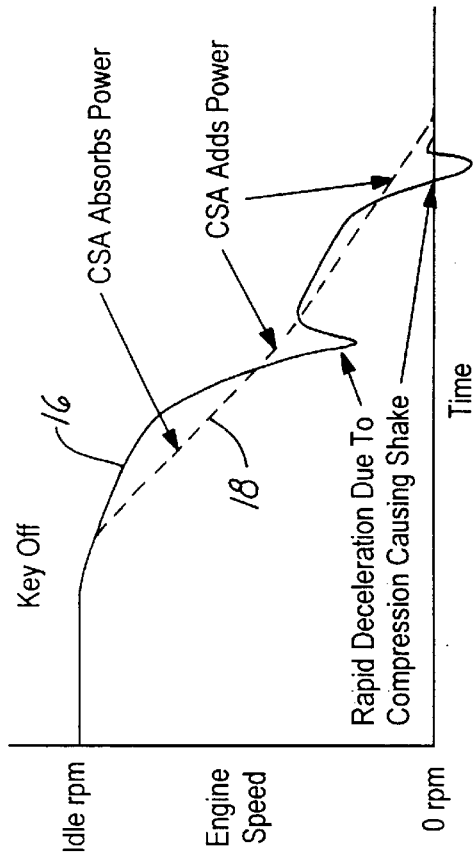
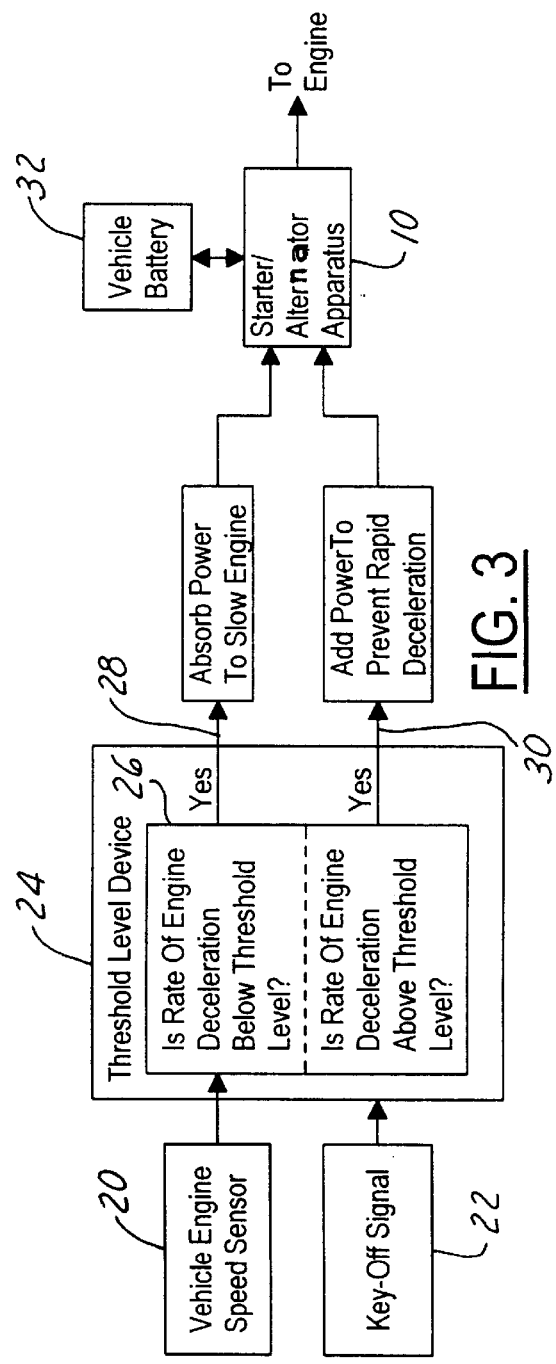

SYSTEM FOR PREVENTING VIBRATIONS IN A DIESEL ENGINE

BACKGROUND OF THE INVENTION

1. Field of the Invention

The present invention relates to automotive engines, and more particularly to a system for preventing vibrations occurring in a diesel engine during shut down.

2. Description of the Prior Art

Previously known systems for suppressing engine vibrations use torque output control techniques wherein torque fluctuations are detected at the engine crankshaft and a current is applied to an alternator to vary a reverse torque applied to the crankshaft.

Another known prior art technique is to sense the angular speed of the engine crankshaft and convert the speed into a current, compare it to a reference value and then selectively apply the current to a motor/generator connected to the crankshaft.

Still another technique for reducing engine vibration includes means for sensing the engine combustion pressure and varying the engine output torque when an improper combustion occurs.

SUMMARY OF THE INVENTION

An object of the present invention is to provide a system for suppressing vibrations of an automotive engine.

Another object of the present invention is to provide a system to apply a positive and/or negative power to an engine to effect a smooth deceleration of the rotating parts of the engine.

A further object of the present invention is to provide a system wherein a combined starter/alternator apparatus is used to prevent vibrations occurring during shut down of a diesel engine.

BRIEF DESCRIPTION OF THE DRAWINGS

The above set forth and other features of the invention are made more apparent in the ensuing detailed description of the invention when read in conjunction with the attached drawings, wherein:

FIG. 1 is a schematic block diagram illustrating a system for suppressing engine vibrations wherein a combined starter/alternator apparatus is connected between an engine and a transmission structure.

FIG. 2 is a schematic illustration of the curve of an engine rate of speed during deceleration.

FIG. 3 is a schematic illustration of a functional block diagram of an engine control system for suppressing vibrations during the shut down of the engine according to the principles of the present invention.

DESCRIPTION OF THE PREFERRED EMBODIMENT

When an engine is decelerating and shutting down, particularly a diesel engine, torque fluctuations due to abnormal combustion produce undesired vibration. The high compression ratio of a diesel engine causes the engine crankshaft to stop rotating abruptly when the engine is shut down. As the pistons approach the top of their compression stroke, a high resistance is experienced due to the compressed gas and the resultant force will cause a rapid deceleration of the crankshaft.

As the crankshaft comes to rest, depending on the exact position of the pistons, the compressed gases may cause the engine to bounce backwards briefly or, if the piston passes top center, to accelerate forward briefly. All of these effects, the rapid deceleration and bounce back or forward, cause a shaking of the engine that can be felt as an unpleasant movement by the vehicle occupants.

A known solution for this problem is the addition of a throttle plate in the engine air intake system. This throttle plate is closed when the engine is shut down. The result is a significant reduction in the gas pressure present in the cylinder and a reduction in the shaking forces.

In the present invention a combined engine alternator/starter system is used to control shake during shut down, thus saving the cost of an additional throttle.

FIG. 1 shows an embodiment of the present invention wherein a combined starter/alternator apparatus 10 is connected between an engine 12 and a transmission 14.

The combined starter/alternator 10 is a single electrical machine provided in a vehicle that performs the dual functions of providing torque power to start a vehicle engine and to absorb power from the engine rotation to generate electricity. The combined starter/alternator is controlled to provide torque to the engine via the starter and to generate electricity via the alternator, thus it functions as both a starter motor and as a generator of electrical power.

The combined starter/alternator 10 has two main electrical components, one component mounted to the engine flywheel (or the torque converter in an automatic), which rotates the engine. The second component is a stationary part mounted around the first component. There is no mechanical connection between the two components, the connection is via magnetic flux. Electrical currents are manipulated in the stationary part to either induce a torque in the rotating part for starting the engine, or to generate electrical energy in the stationary part for power generation. In the present invention, the starter/alternator 10 is used to absorb power from or add power to the engine flywheel or other rotating part, thus modifying the speed of the engine and the rate of change of the speed, particularly during shut down. Thus, the starter/alternator 10 provides a positive and/or negative torque as necessary to the engine rotating part to effect a smooth deceleration of the rotating parts of the engine 12 during shut down. The rotating parts of the engine include the crankshaft, cam rods pistons and valve train.

According to the present invention, the combined starter/alternator 10 is used in combination with the engine 12 such that, during engine shut down after the ignition is turned off, it controls the way in which the rotating parts of the engine come to rest and thus prevents unacceptable engine shaking.

Referring to FIG. 2, the manner in which the engine 12 comes to rest during shut down and the resultant effects of the use of the combined started/alternator to control the vibration is illustrated. In FIG. 2, the solid line 16 indicates the performance of engine 12 without vibration suppression. As seen by line 16, engine 12 undergoes a series of rapid decelerations. The dotted line 18 in FIG. 2 indicates the performance of engine 12 when the combined started/alternator 10 is used to prevent the rapid decelerations. In operation, power absorbed when engine piston compression of the gas is not taking place to slow the engine, and power is added when cylinder compression is occurring in order to prevent a rapid deceleration.

The torque applied or absorbed by the combined starter/alternator is variable according to the needs of the engine and installation. The control system modifies the engine speed and alters the combined starter/alternator function to provide for the smoothest deceleration of the engine. The exact nature of the modification of the combined starter/alternator function can be developed for the particular engine installation.

When the combined starter/alternator is used to absorb power to slow the engine, electricity is generated which is stored in an electrical storage device such as a battery, capacitor or the like. When the combined starter/alternator is used to provide torque to the engine, electricity is supplied to it from an electrical storage device such as a battery, capacitor or the like.

The system of the present invention is controlled by signals from a computer contained in the vehicle. Referring to FIG. 3, a system control function illustration is shown wherein rate of change of engine speed signals from a vehicle engine speed sensor 20 and a vehicle ignition key-off signal 22 are introduced to a computer control means segment 24 to determine if the rate of engine speed deceleration is below a selected threshold level. More particularly, the key-off signal indicates that the engine is operating in the shut down mode. The engine speed sensor 20 may be a counter that counts the teeth on the engine flywheel to continually determine the rate change of the engine speed, (i.e. the deceleration) of the engine. The output signals from the rate of speed sensor 20 are continuously applied to threshold level device 26 of control system 24 where the rate of change of engine speed is then continuously compared to a selected threshold level for the particular application. The comparison of the rate of change of the engine speed with the threshold level in threshold device 26 results in either add power or absorb power decisions.

More particularly, the signals from engine speed sensor 20 and the vehicle ignition key-off signal from 22 are both applied to threshold device 26 in computer control means segment 24 which will generate a first, Yes,(absorb power) signal 28 if the rate of the engine deceleration is below the threshold value. The Yes signal 28 is connected to and instructs the combined starter/alternator 10 to absorb power from the engine to slow it. If the rate of engine deceleration is above the threshold level, a second, Yes, signal 30 (add power) will be produced to instruct the combined starter/alternator to add power (torque) to the engine to prevent rapid deceleration.

The process illustrated in FIG. 3 is a continuous process of monitoring the rate of engine speed by sensor 20 and applying it to control means 24 as indicated by the curves shown in FIG. 2. If the engine is slowing too quickly power is added and the speed is then reassessed by sensor 20; if the engine is not slowing fast enough power is absorbed. The process continues until the engine 12 comes to rest.

When electricity is generated by the combined starter/alternator it is stored in the vehicle battery 32 when power is absorbed from the engine in response to the first, Yes, signal from the control means. Electricity is supplied to the combined starter/alternator from the engine vehicle battery 32 when power is added to the engine in response to the second, Yes, signal from the control means.

The selected threshold level and other system parameters used in the embodiment of FIG. 3 would vary for different engine installations and are subject to system development.

While the invention has been described in connection with a preferred embodiment, it is not intended to limit the scope of the invention to the particular form set forth, but, on the contrary, it is intended to cover such alternatives, modifications, and equivalences as may be included within the spirit and scope of the invention as described in the appended claims.

What is claimed is:

1. A system for suppressing engine vibrations comprising:
   a combined starter/alternator apparatus including a starter component connected to the engine for selectively rotating an engine part to add power to the engine and an alternator component connected to the engine for selectively generating electricity and absorbing power from the engine;
   a control means including a threshold level device for providing a rate of speed threshold level value;
   a key-off means connected to the control means to provide a signal when the engine ignition is turned off and the engine begins to shut down;
   sensor means connected to the engine to provide signals representative of the rate of speed of the engine, the threshold level device being connected to the sensor means for comparing the rate of speed signal from the sensor means to the threshold level for providing a first, Yes, signal when the rate of speed signal from the sensor device is below the threshold level, and a second, Yes, signal when the rate of speed signal from the sensor means is above the threshold level; and
   the combined started alternator apparatus being responsive to the first, Yes, signal from the control means to absorb power from the engine and responsive to the second, Yes, signal from the control means to add power to the engine to suppress engine vibrations during the shut down.

2. The system for suppressing engine vibrations according to claim 1 wherein the combined starter/alternator apparatus is connected to the engine flywheel.

3. The system for suppressing engine vibrations according to claim 1 wherein the combined starter/alternator apparatus is connected to the engine crankshaft.

4. The system for suppressing engine vibrations according to claim 1 wherein the power absorb or added to the engine continually varies in accordance with variations of engine rate of speed signal from the sensor means during the engine shut down to provide smooth deceleration.

5. The system for suppressing engine vibrations according to claim 1 wherein the sensor means counts the teeth on the flywheel to determine the engine rate of speed signal.

6. The system for suppressing engine vibrations according to claim 1 wherein electricity is generated by the combined starter/alternator and stored in the vehicle battery when power is absorbed from the engine in response to the first Yes signal from the control means.

7. The system for suppressing engine vibrations according to claim 1 wherein electricity is supplied to the combined starter/alternator from the engine vehicle battery when power is added to the engine in response to the second Yes signal from the control means.

8. A method for suppressing engine vibrations during engine shut down comprising the steps of:
   determining the rate of speed of an engine during shut down;
   comparing the rate of engine speed with a given threshold level value;
   producing a first signal when the rate of speed of the engine is below the threshold level value;
   absorbing power from the engine to slow the rate of speed of the engine when the rate of speed of the engine is below the threshold level value;

producing a second signal when the rate of sped of the engine is above the threshold level value; and adding power to the engine when the rate of speed of the engine is below the threshold level value.

9. The method for suppressing engine vibrations during engine shut down according to claim 8 wherein the determining the rate of speed step and the comparing the rate of speed to a the threshold value is a continuous process to provide for smooth engine deceleration during shut down.

10. The method for suppressing engine vibrations during shut down according to claim 8 wherein the determining the rate of speed of the engine includes the step of counting the teeth of the engine flywheel.

* * * * *